(12) United States Patent
Hoshi et al.

(10) Patent No.: US 12,230,441 B2
(45) Date of Patent: Feb. 18, 2025

(54) TRANSPORT DEVICE AND TRANSPORT METHOD

(71) Applicant: HITACHI HIGH-TECH CORPORATION, Tokyo (JP)

(72) Inventors: Ryosuke Hoshi, Tokyo (JP); Yasuaki Aoyama, Tokyo (JP); Satoru Kaneko, Tokyo (JP); Hiroyuki Kobayashi, Tokyo (JP); Takeshi Tamakoshi, Tokyo (JP); Katsuhiro Kambara, Tokyo (JP); Hiroshi Watanabe, Tokyo (JP); Kuniaki Onizawa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 296 days.

(21) Appl. No.: 17/614,577

(22) PCT Filed: Apr. 7, 2020

(86) PCT No.: PCT/JP2020/015611
§ 371 (c)(1),
(2) Date: Nov. 29, 2021

(87) PCT Pub. No.: WO2020/255538
PCT Pub. Date: Dec. 24, 2020

(65) Prior Publication Data
US 2022/0238267 A1    Jul. 28, 2022

(30) Foreign Application Priority Data
Jun. 18, 2019   (JP) .................................. 2019-112486

(51) Int. Cl.
*H01F 7/20*        (2006.01)
*H01F 7/06*        (2006.01)
(Continued)

(52) U.S. Cl.
CPC .............. *H01F 7/206* (2013.01); *H01F 7/064* (2013.01); *H01F 27/02* (2013.01); *H01F 27/24* (2013.01); *H01F 27/28* (2013.01)

(58) Field of Classification Search
CPC .......... H01F 7/206; H01F 7/064; H01F 27/02; H01F 27/24; H01F 27/28;
(Continued)

(56) References Cited

U.S. PATENT DOCUMENTS 6,045,319  A      4/2000  Uchida et al.
2002/0167230  A1  11/2002  Yajima et al.
(Continued)

FOREIGN PATENT DOCUMENTS

EP    2 589 967 A1    5/2013
JP    61-088760 A    5/1986
(Continued)

OTHER PUBLICATIONS

International Search Report of PCT/JP2020/015611 dated Jun. 30, 2021.
International Preliminary Report on Patentability dated Jun. 24, 2021.
Extended European Search Report received in corresponding European Application No. 20825123.1 dated Jun. 12, 2023.

*Primary Examiner* — Thienvu V Tran
*Assistant Examiner* — Sreeya Sreevatsa
(74) *Attorney, Agent, or Firm* — MATTINGLY & MALUR, PC (57) ABSTRACT

A transport device and a transport method efficiently increase a thrust to suppress power consumption. The transport device has a first magnetic body on a side of a to-be-transported object, a magnetic circuit with a core consisting of a second magnetic body, and a winding wound around an outside of the core, and a drive circuit supplying a current to the winding of the magnetic circuit. The magnetic circuit has first and second magnetic circuits, and in a case where the first magnetic body is located on a side (Continued)

of the second magnetic circuit relative to a first predetermined position between the first magnetic circuit and the second magnetic circuit, the drive circuit supplies a current to a winding of the first magnetic circuit in such a manner to cause an electromagnetic repulsive force to be generated between the first magnetic body and the first magnetic circuit.

5 Claims, 9 Drawing Sheets

(51) Int. Cl.
  *H01F 27/02* (2006.01)
  *H01F 27/24* (2006.01)
  *H01F 27/28* (2006.01)
(58) Field of Classification Search
  CPC ........... G01N 2035/0477; G01N 35/04; H02K 41/031; H02P 25/064; B65G 54/02
  USPC .......................................................... 361/144
  See application file for complete search history.

(56) References Cited

U.S. PATENT DOCUMENTS

| | | | |
|---|---|---|---|
| 2005/0200213 A1* | 9/2005 | Takeuchi | H02P 6/28 |
| | | | 318/725 |
| 2008/0284260 A1* | 11/2008 | Miyamoto | H02K 41/03 |
| | | | 310/28 |
| 2014/0234978 A1 | 8/2014 | Heise et al. | |
| 2017/0101277 A1 | 4/2017 | Malinowski | |
| 2018/0074087 A1* | 3/2018 | Heise | B65G 54/02 |

FOREIGN PATENT DOCUMENTS

| | | |
|---|---|---|
| JP | 11-059901 A | 3/1999 |
| JP | 2002-335666 A | 11/2002 |
| JP | 2005-261135 A | 9/2005 |
| JP | 2008-271741 A | 11/2008 |
| JP | 2017-227648 A | 12/2017 |

* cited by examiner

TRANSPORT DEVICE AND TRANSPORT METHOD

TECHNICAL FIELD

This invention relates to a transport device.

BACKGROUND ART

In a specimen analysis system, devices with plural functions are connected with respect to specimens (samples) such as blood, blood plasma, blood serum, urine, and other body fluids in order to inspect instructed analysis items and each process is automatically processed. Namely, in the specimen analysis system, analysis sections in a plurality of analysis fields such as biochemistry and immunity are connected by a transport line and the specimen analysis system is operated as a single device.

A transport device for a specimen in this specimen analysis system generally generates an electromagnetic attraction force between it and a permanent magnet provided at a holder holding the specimen, or the like by supplying current to a winding of an electromagnetic circuit and this electromagnetic attraction force is used as a thrust. However, since this electromagnetic attraction force may also generate a frictional force with a transport surface, an electromagnetic repulsive force is generated with the permanent magnet and to use this electromagnetic repulsive force as a thrust is being also undertaken.

For example, Patent Literature 1 describes that "a second electromagnetic actuator is actuated in such a manner that a pulling force with respect to a second permanent magnet having an annular shape is generated as a result and a third electromagnetic actuator is actuated in such a manner that a pushing force with respect to the second permanent magnet is generated as a result" (paragraph [0111]).

CITATION LIST

Patent Literature

Patent Literature 1: Japanese Unexamined Patent Application Publication No. 2017-227648

SUMMARY OF INVENTION

Technical Problem

However, the transport device described in the patent literature 1 actuates, in a case where a permanent magnet is located on a middle electromagnetic actuator among three adjacent electromagnetic actuators, an electromagnetic actuator on one end to use the electromagnetic repulsive force as a thrust and actuates an electromagnetic actuator on the other end to also use the electromagnetic repulsive force as a thrust. Namely, since the electromagnetic actuators located at a position far from the permanent magnet is actuated, the electromagnetic repulsive force is small, and a useless current loss is produced.

An object of this invention is to provide a transport device and transport method which efficiently increase a thrust and suppress power consumption.

Solution to Problem

A transport device according to this invention comprises a plurality of means solving the above-mentioned problem but is characterized, as one example, by comprising a first magnetic body provided on a side of a to-be-transported object, a magnetic circuit comprising a core consisting of a second magnetic body, and a winding around an outside of the core, and a drive circuit supplying a current to the winding of the magnetic circuit; the magnetic circuit comprising a first magnetic circuit, and a second magnetic circuit adjacent the first magnetic circuit and located on a side to which the to-be-transported object is transported, wherein in a case where it is assumed that a predetermined current with the same absolute value is applied to the first magnetic circuit and the second magnetic circuit, when the first magnetic body is located between from the first magnetic circuit to a first predetermined position, an absolute value of an electromagnetic attraction force to the first magnetic body which is produced by the second magnetic circuit becomes larger than an absolute value of an electromagnetic repulsive force with respect to the first magnetic body which is produced by the first magnetic circuit, when the first magnetic body is located at the first predetermined position, an absolute value of an electromagnetic attraction force to the first magnetic body which is produced by the second magnetic circuit becomes equal to an absolute value of an electromagnetic repulsive force with respect to the first magnetic body which is produced by the first magnetic circuit, and when the first magnetic body is located between from the first predetermined position to the second magnetic circuit, an absolute value of an electromagnetic attraction force to the first magnetic body which is produced by the second magnetic circuit becomes smaller than an absolute value of an electromagnetic repulsive force with respect to the first magnetic body which is produced by the first magnetic circuit, and wherein in a case where the first magnetic body is located on a side of the first magnetic circuit relative to the first predetermined position, the drive circuit mainly supplies a current to a winding of the second magnetic circuit in such a manner that an electromagnetic attraction force which is produced between the first magnetic body and the second magnetic circuit becomes a main thrust, in a case where the first magnetic body is located on a side of the second magnetic circuit relative to the first predetermined position, the drive circuit mainly supplies a current to a winding of the first magnetic circuit in such a manner that an electromagnetic repulsive force which is produced between the first magnetic body and the first magnetic circuit becomes a main thrust, and at the time of starting the first magnetic body, the drive circuit supplies a current to the winding of the second magnetic circuit in such a manner that an electromagnetic attraction force is first applied between the first magnetic body and the second magnetic circuit.

Advantageous Effect of Invention

In accordance with this invention, there is provided a transport device and transport method which efficiently increase a thrust and suppress power consumption.

DESCRIPTION OF EMBODIMENTS

With reference to FIGS. 1 to 9, embodiments according to this invention will be explained.

Embodiment 1

Figure 1:
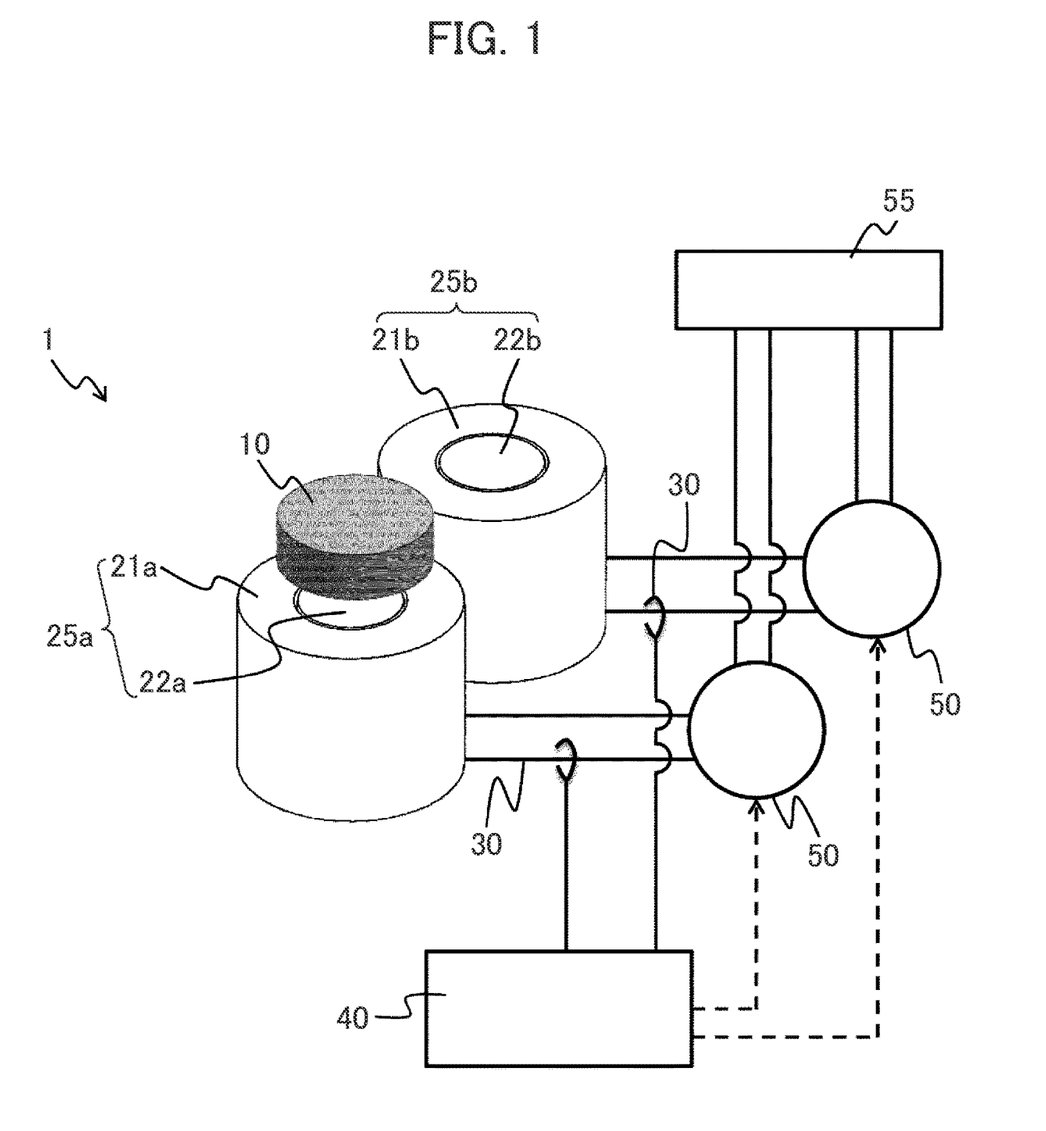
FIG. 1 is a view showing an outline of a transport device of an embodiment 1 of the present invention.

With reference to FIGS. 1 to 4, an embodiment 1 of a transport device according to this invention will be explained. Referring to FIG. 1, a schematic configuration of the transport device according to this invention will be first explained. FIG. 1 is a view schematically showing an outline of the transport device wherein two magnetic poles 25 and a permanent magnet 10 relatively operate.

As shown in FIG. 1, the transport device 1 of this embodiment comprises a permanent magnet (a first magnetic body) 10, magnetic poles 25, drive circuits 50, a current detection section 30, an arithmetic section 40, and a power source 55. The permanent magnet 10 is provided on a side of a to-be-transported object and preferably neodymium, ferrite or the like is used. However, in lieu of the permanent magnet 10, other magnets and a soft magnetic body may be employed.

An example of the to-be-transported object at which the permanent magnet 10 is provided is a specimen holder holding specimen containers one by one, and a specimen rack holding a plurality of specimen containers. The permanent magnet 10 is incorporated into such a specimen holder or a specimen rack so as to be integral with them and the permanent magnet 10 is transported, whereby the specimen container and the holder or the rack are transported to a predetermined position.

As shown in FIG. 1, at least two or more magnetic poles 25 are provided at the transport device 1. Each magnetic pole 25 has a core 22 consisting of a magnetic body (a second magnetic body), and a winding 21 wound around an outer circumference of the core 22. The columnar core 22 of the magnetic pole is arranged so as to be opposed to the permanent magnet 10.

The drive circuit 50 are connected to the windings 21 of the magnetic poles 25 and the current detection section 30 detecting a value of a current flowing through the windings 21 is provided. Incidentally, while the current detection section 30 is considered to be one, configured by a serial resistor or a current transformer, one employing a Hall current sensor, etc., the current detection section is not limited to them. The drive circuits 50 are connected to the power source 55 such as an AD power source or a DC power source such as a battery. The drive circuits 50 receives a current from this power source 55 and supply the current to the windings 21 of the magnetic poles 25.

The arithmetic section 40 calculates a relative position relationship between the cores 22 and the permanent magnet 10, based on a current value detected by the current detection section 30, and calculates a position of the permanent magnet 10 in the transport device 1. Moreover, the arithmetic section 40 determines a timing for supplying a current required for drive of the permanent magnet 10 from the drive circuit 50, using calculated position information of the permanent magnet 10, and supplies the current to the suitable windings 21.

Next, referring to FIGS. 2 to 4, a method of effectively using an electromagnetic repulsive force will be explained. This embodiment shows a case where a ratio among a diameter of the permanent magnet 10, pitches of the magnetic pole $25a$ and the magnetic pole $25b$, and a gap length are 5:4:1.

Figure 2:
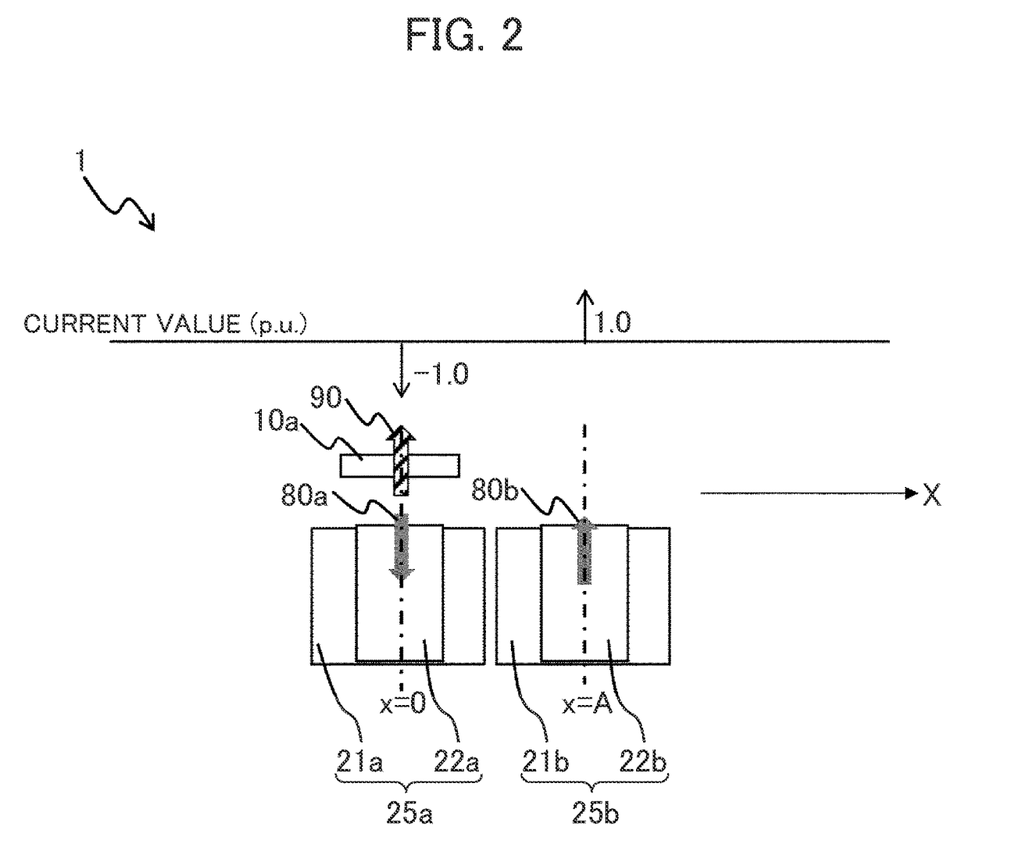
FIG. 2 is a schematic diagram of the transport device of the embodiment 1 of the present invention.

FIG. 2 is a schematic diagram showing an outline of the permanent magnet 10 and the two magnetic pole $25a$ and magnetic pole $25b$, provided that x=0 expresses directly above the magnetic pole $25a$, x=A expresses directly above the magnetic pole $25b$, and the permanent magnet 10 moves toward an X-axis forward direction in FIG. 2. In the transport device 1, the current is applied to the windings 21, whereby an electromagnetic force is applied to and moves the permanent magnet 10 between the magnetic poles 25. In order to efficiently utilize the electromagnetic force and move in a predetermined direction, the relative position information of the permanent magnet 10 and the magnetic poles 25 is required.

For example, in a case where the permanent magnet 10 is located directly above the magnetic pole $25a$, even if a current is applied to a winding $21a$ of the magnetic pole $25a$ just below it in such a manner to produce a magnetic flux $80a$ in a direction reverse to a magnetic flux 90 of the permanent magnet, a force in a transport direction is not produced. Contrarily, a current is applied to a winding $21b$ of the magnetic pole $25b$, directly above which the permanent magnet 10 is located, in a manner to produce a magnetic flux $80b$ in the same direction as the magnetic flux 90 of the permanent magnet 10, whereby an electromagnetic attraction force that pulls the permanent magnet 10 toward the magnetic pole $25b$ can be produced.

Moreover, when the permanent magnet 10 moves from directly above the magnetic pole $25a$, a current is applied to the winding $21a$ of the magnetic pole $25a$ in a manner to produce the magnetic flux $80a$ in a direction reverse to the permanent magnet 10, whereby an electromagnetic repulsive force that pushes the permanent magnet 10 to the magnetic pole $25b$ can be produced. Namely, the electromagnetic force can be efficiently utilized and, moreover, the electromagnetic force can be controlled in a predetermined direction.

Figure 3:
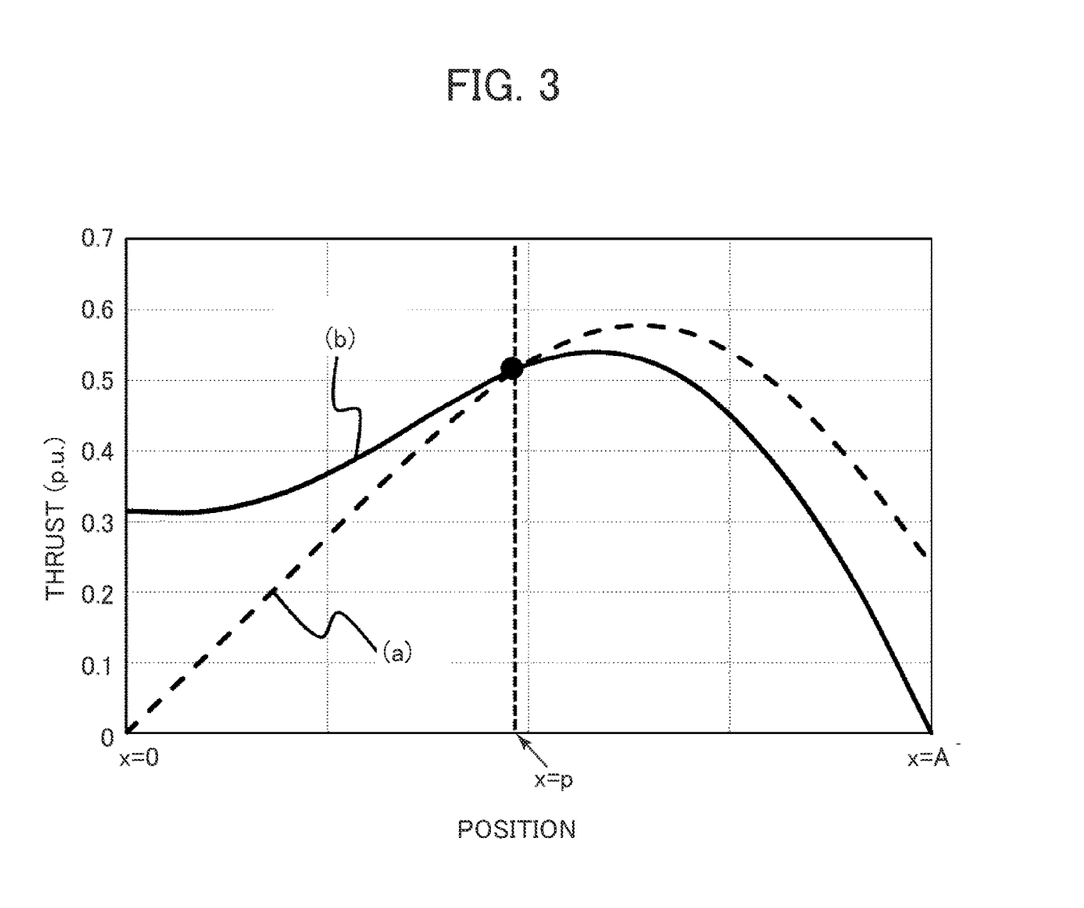
FIG. 3 is a view illustrating characteristics of an electromagnetic attraction force and an electromagnetic repulsive force with respect to a position in the embodiment 1 of the present invention.

FIG. 3 shows a thrust by the electromagnetic repulsive force (a) at the time of applying −1.0 p.u. to the winding $21a$, and a thrust by the electromagnetic attraction force (b) at the time of applying +1.0 p.u. to the winding $21b$. Incidentally, the thrust in FIG. 3 are those at the time when the permanent magnet 10 exists in a section from x=0 to x=A. Also, x=p is a position where an absolute value of the electromagnetic repulsive force (a) generating at the time of applying a predetermined current to the winding $21a$ and an absolute value of the electromagnetic attraction force (b) generating at the time of flowing a predetermined current to the winding $21b$ become equal, provided that this position x=p varies depending upon a configuration of the magnetic circuit and a configuration of the permanent magnet.

Between x=0 and x=p, the electromagnetic attraction force (b) at the time of applying 1.0 p.u. to the winding 21b is large compared to the electromagnetic repulsive force (a) at the time of flowing −1.0 p.u. On the other hand, between from x=p to x=A, the electromagnetic attraction force (b) at the time of applying 1.0 p.u. to the winding 21b is small compared to the electromagnetic repulsive force (a) at the time of applying −1.0 p.u. to the winding 21a. Therefore, between from x=p to x=A, −1.0 p.u. is applied to the winding 21a and the electromagnetic repulsive force (a) is utilized as a main thrust, whereby it is possible to efficiently increase the thrust while suppressing power consumption.

Figure 4:
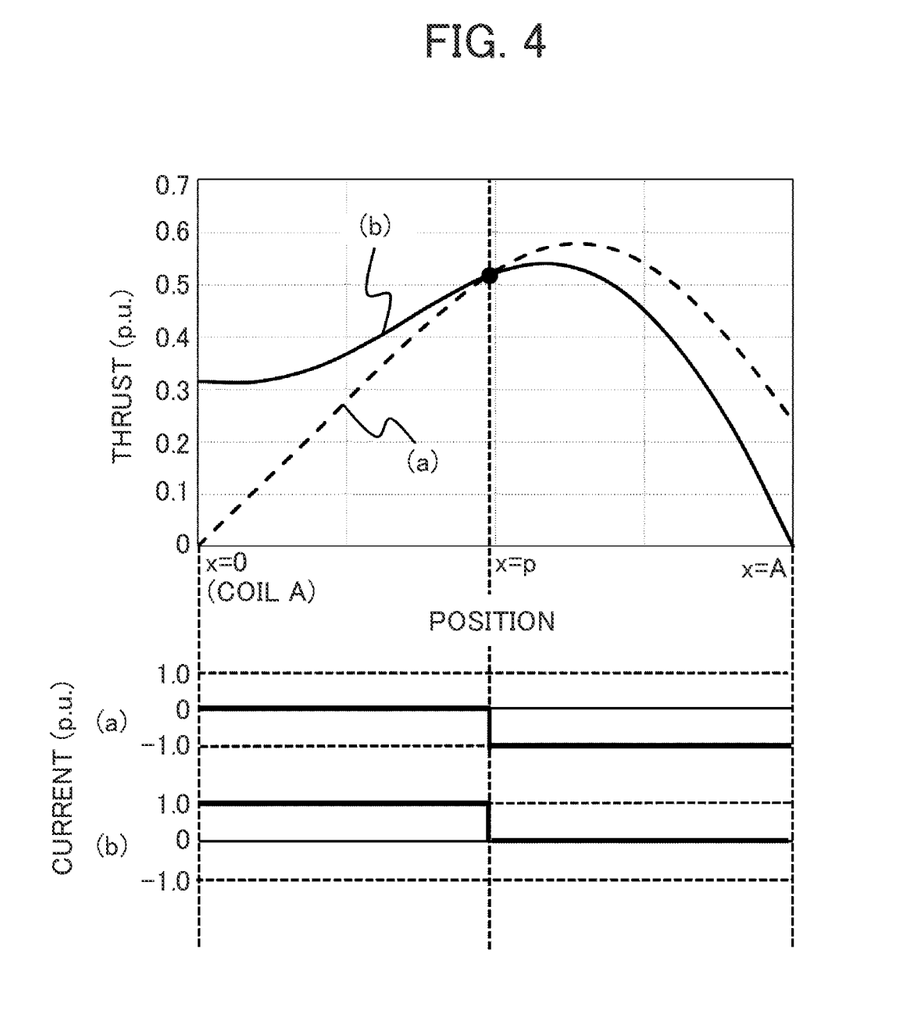
FIG. 4 is a view illustrating a current pattern in the embodiment 1 of the present invention

FIG. 4 shows current waveforms of the winding 21a and winding 21b relative to the position of the permanent magnet 10. In this embodiment, magnitudes of the electromagnetic attraction force (b) and electromagnetic repulsive force (a) are replaced at x=p. Therefore, as shown in FIG. 4, at from x=0 to x=p, a current that produces the electromagnetic attraction force (b) attracting the permanent magnet 10 is applied to the winding 21b and, at from x=p to x=A, a current that produces the electromagnetic repulsive force (a) pushing the permanent magnet 10 is applied to the winding 21a. In this manner, by using the electromagnetic attraction force and the electromagnetic repulsive force separately depending upon the position of the permanent magnet, it is possible to suppress a useless current loss and efficiently obtain the thrust.

Here, a section where a current is applied to the winding 21a and a section where a current is applied to the winding 21b may be overlapped. In that case, in a section where the winding 21a and the winding 21b are energized at the same time, it is possible to obtain a larger electromagnetic force. Moreover, between the section where a current is applied to the winding 21a and the section where a current is applied to the winding 21b, a section where a current is not applied to every winding may exist. In that case, in the section where the current is not applied to every winding, the permanent magnet moves by inertia, and it is possible to reduce power consumption.

Moreover, in a case where the permanent magnet is actuated when locating at the position of x=0, at a first section from x=0 to x=p, the electromagnetic attraction force is first applied to determine a direction of transport, and then the electromagnetic repulsive force is also used as a thrust, so that it is possible to positively move the permanent magnet 10 in the predetermined direction. Furthermore, at the time of giving a thrust to the permanent magnet 10, the two magnetic poles adjacent to each other; the magnetic pole nearest to the permanent magnet 10 and the next nearest magnetic pole are used, so that it is possible to produce a large electromagnetic attraction force and electromagnetic repulsive force.

Embodiment 2

Referring FIGS. 5 and 6, an embodiment 2 of this invention will be explained. A magnitude relation of the electromagnetic attraction force and electromagnetic repulsive force varies depending upon a diameter of the permanent magnet 10, pitches of the magnetic pole 25a and magnetic pole 25b, and a gap length. For that reason, according to the configuration of the transport device 1, there is a case where two or more points at which the magnitude relationship of the electromagnetic attraction force and electromagnetic repulsive force is switched. This embodiment shows a case where a ratio among the diameter of the permanent magnet 10, the pitches of the magnetic pole 25a and magnetic pole 25b, and the gap length is 1:2:1.

Figure 5:
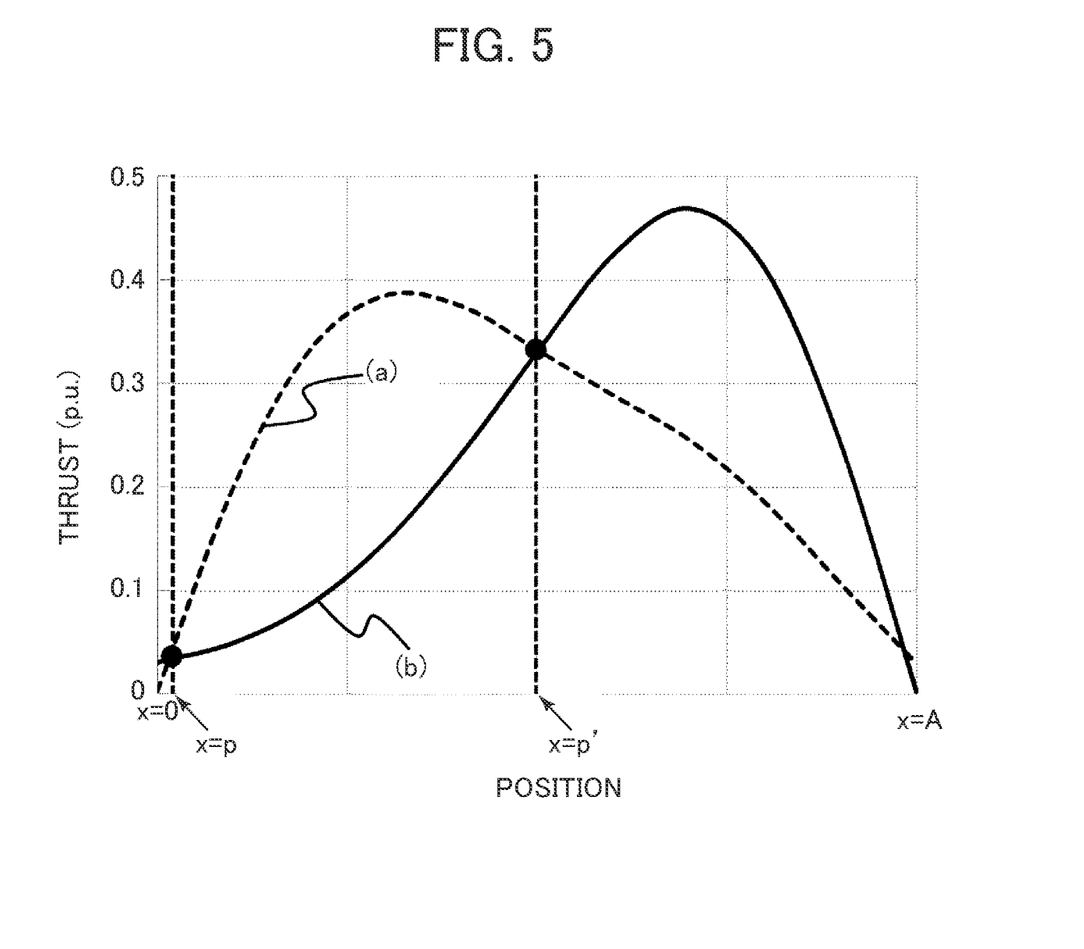
FIG. 5 is a view illustrating characteristics of an electromagnetic attraction force and an electromagnetic repulsive force with respect to a position in an embodiment 2 of the present invention.

FIG. 5 shows a thrust by the electromagnetic repulsive force (a) at the time when −1.0 p.u. is applied to the winding 21a, and a thrust by the electromagnetic attraction force (b) at the time when +1.0 p.u. is applied to the winding 21b. Incidentally, the thrust of FIG. 5 are those at the time when the permanent magnet 10 exists in the section from x=0 to x=A. Further, x=p and x=p' are positions at which an absolute value of the electromagnetic repulsive force (a) generating when a predetermined current is applied to the winding 21a and an absolute value of the electromagnetic attraction force (b) generating when the predetermined current is applied to the winding 21b become equal.

Between x=0 and x=p, the permanent magnet 10 exists nearly directly above the magnetic pole 25a, so that the electromagnetic attraction force (b) at the time when 1.0 p.u. is applied to the winding 21b is large compared to the electromagnetic repulsive force (a) at the time when −1.0 p.u. is applied to the winding 21a. Next, between from x=p to x=p', the electromagnetic attraction force (b) at the time when 1.0 p.u. is applied to the winding 21b is small compared to the electromagnetic repulsive force (a) at the time when −1.0 p.u. is applied to the winding 21a. And, between from x=p' to x=A, the electromagnetic attraction force (b) at the time when 1.0 p.u. is applied to the winding 21b is large compared to the electromagnetic repulsive force (a) at the time when −1.0 p.u. is applied to the winding 21a. Therefore, between from x=0 to x=p and between x=p' and x=A, it is desirable that current is applied to the winding 21b mainly and a main thrust is obtained by the electromagnetic attraction force (b). On the other hand, between x=p and x=p', it is desirable that a current is applied to the winding 21a mainly and the main thrust is obtained by the electromagnetic repulsive force (a).

Figure 6:
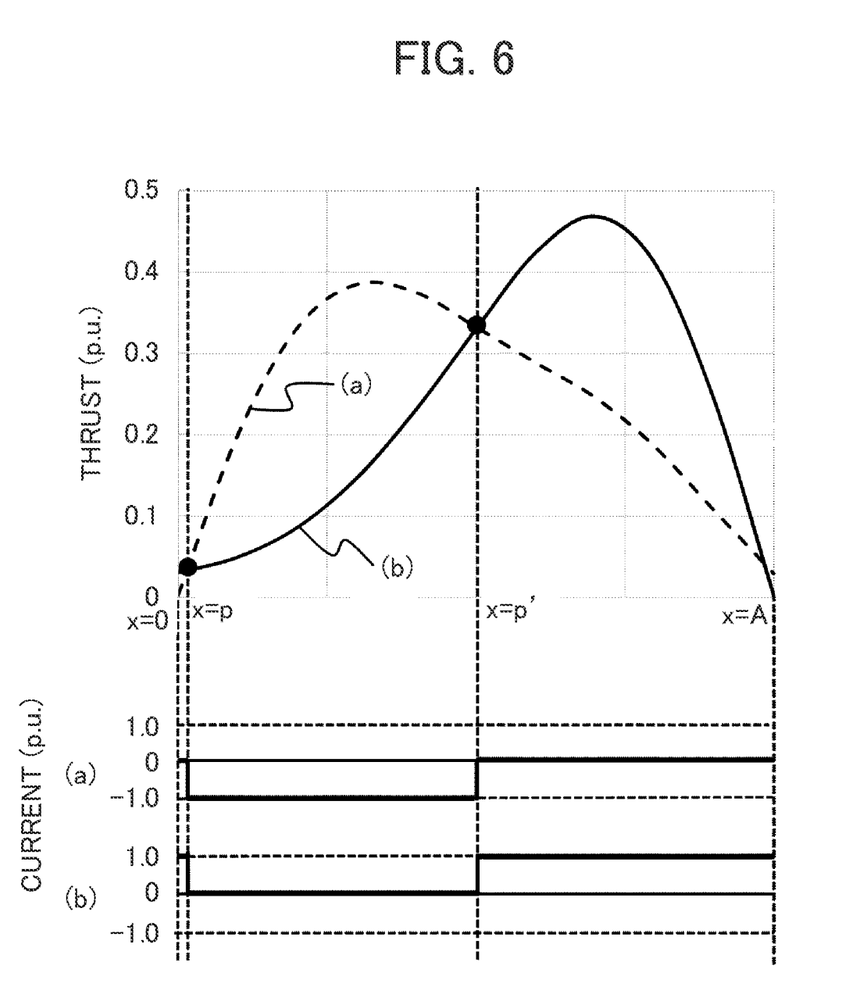
FIG. 6 is a view illustrating a current pattern in the embodiment 2 of the present invention.

FIG. 6 shows current waveforms of the winding 21a and winding 21b relative to the position of the permanent magnet 10. In this embodiment, the magnitudes of the electromagnet attraction force (b) and electromagnetic repulsive force (a) are replaced at x=p and x=p'. Therefore, as shown in FIG. 6, at from x=0 to x=p and from x=p' to x=A, a current is applied to the winding 21b in order to produce the electromagnetic attraction force (b) and at from x=p to x=p', a current is applied to the winding 21a in order to produce the electromagnetic repulsive force (a). In this way, by using the electromagnetic attraction force and the electromagnetic repulsive separately depending upon the position of the permanent magnet, it is possible to suppress a useless current lo efficiently obtain a thrust.

Embodiment 3

Figure 7:
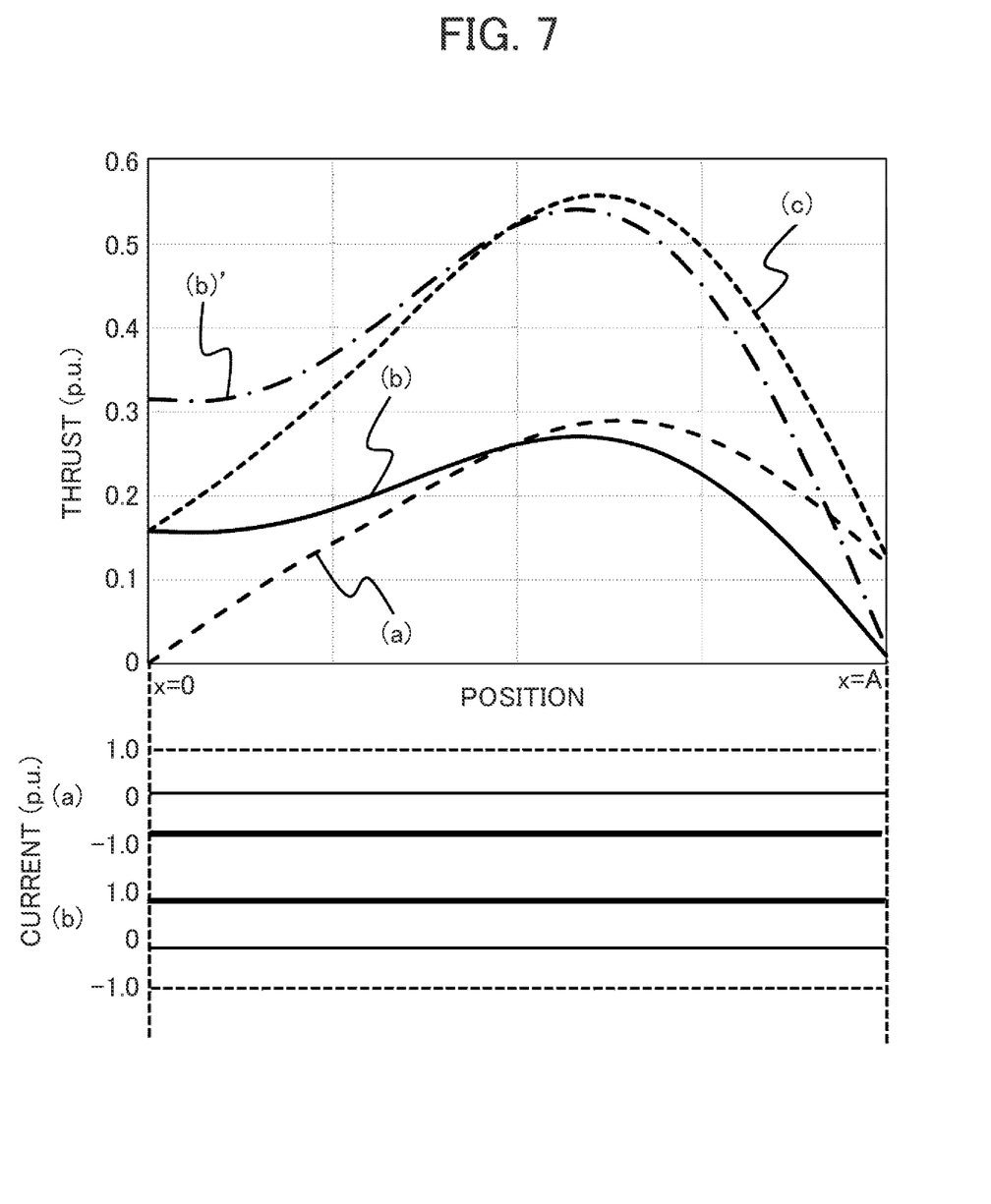
FIG. 7 is a view illustrating characteristics of a thrust with respect to a position and a current pattern in an embodiment 3 of the present invention

Referring to FIG. 7, an embodiment 3 of this invention will be explained. FIG. 7 shows a thrust by the electromagnetic repulsive force (a), a thrust (b) by the electromagnetic attraction force (b) and a thrust (c) by composition of the electromagnetic repulsive force (a) and electromagnetic attraction force (b) in a case where the number of turns on the winding 21 is half that of the embodiment 1. Here, the electromagnetic repulsive force (a) is one produced by applying −1.0 p.u. to the winding 21a and the electromagnetic attraction force (b) is one produced by applying +1.0 p.u. to the winding 21b. Incidentally, (b)' indicates the thrust (b)' by the electromagnetic attraction in the embodiment 1 for comparison.

Generally, when the number of turns is reduced, a magnetomotive force produced by the same current is reduced and the thrust produced by the winding 21 is reduced. Therefore, in this embodiment, in the section from x=0 to x=A, simultaneously with −1.0 p.u. being applied to the winding 21a to produce the electromagnetic repulsive force (a), 1.0 p.u. is applied to produce the electromagnetic attraction force (b). Thereby, a thrust (c) with characteristics nearly equal to those of the thrust (b)' by the electromagnetic attraction force in the embodiment 1 is obtained. Namely, according to this embodiment, even if the number of turns is reduced, a magnetomotive force equivalent to one before the number of turns is halved is obtained by using the electromagnetic attraction force (b) and the electromagnetic repulsive force (a) together. Therefore, it is possible to realize a small-size and lightweight transport device without reducing the thrust and by reducing the winding to shorten the magnetic circuit.

Incidentally, unlike the electromagnetic attraction force, the thrust obtained by the electromagnetic repulsive force is not determined in a specific direction, so that when the thrust is obtained by the electromagnetic repulsive force only, there is a possibility that the specimen meanders and the specimen departs from a transport path. For the reason, when the electromagnetic repulsive force is utilized, it is desirable that the electromagnetic attraction force is always utilized and that the thrust by the electromagnetic attraction force is controlled so as to always become larger than the thrust by the electromagnetic repulsive force.

Embodiment 4

Figure 8:
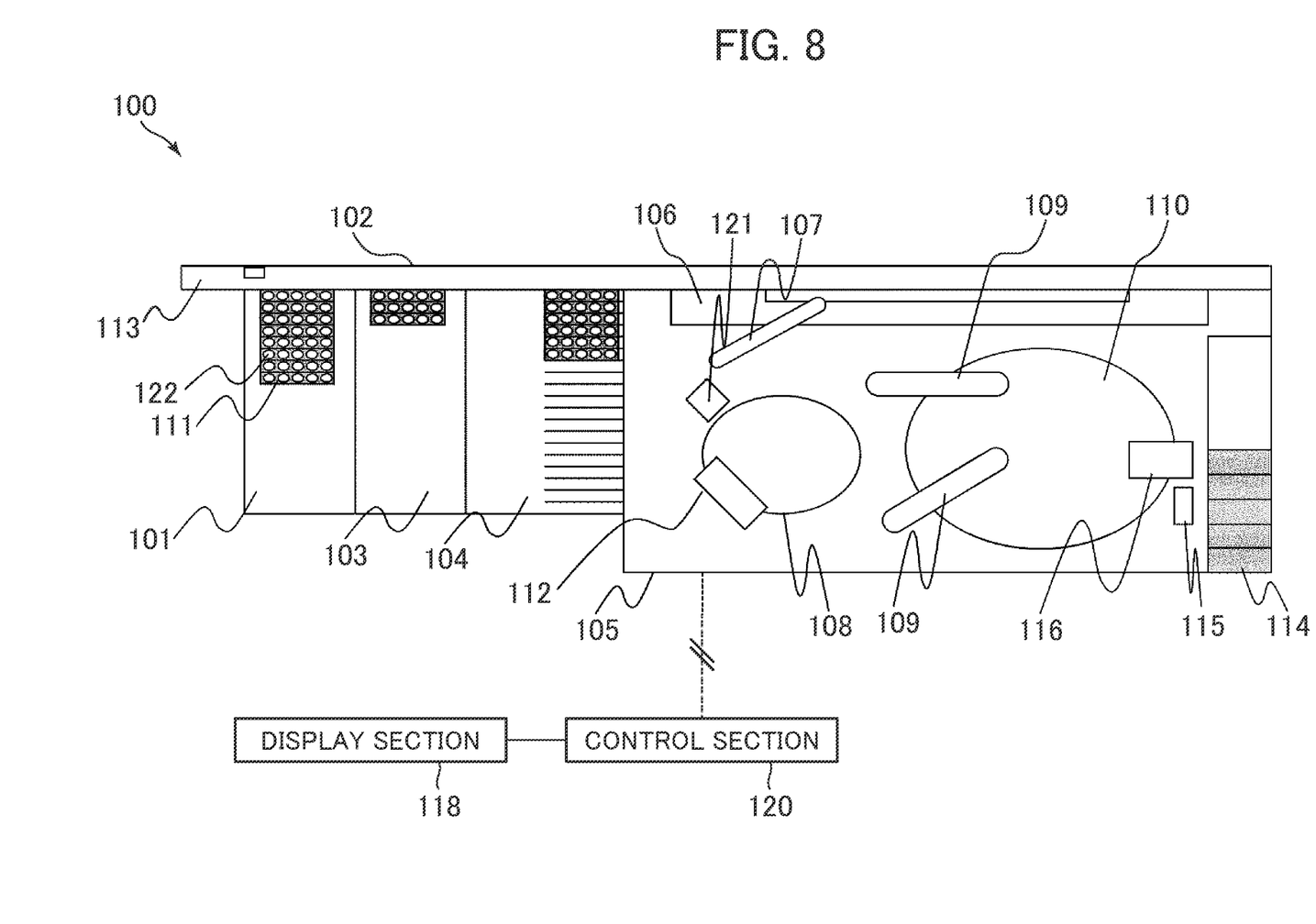
FIG. 8 is a view showing one example of a specimen analysis device of an embodiment 4 of the present invention.

This embodiment is one wherein the transport devices described in the above-mentioned embodiments 1 to 3 are applied to a specimen analysis device 100 and a specimen pretreatment device 150. Referring to FIG. 8, an entire configuration of the specimen analysis device 100 will be first explained. FIG. 8 is a view schematically showing the entire configuration of the specimen analysis device 100.

In FIG. 8, the specimen analysis device 100 is a device dispensing a specimen and a reagent into a reaction container, respectively, to make them react and measuring the reacted liquid and is provided with a carry-in section 101, an emergency rack input entrance 113, a first transport line 102, a buffer 104, an analysis section 105, a storage part 103, a display section 118, a control section 120, etc.

The carry-in section 101 is a place wherein a specimen rack 111 in which a plurality of specimen containers 122 storing biological specimens such as blood, urine, and the like is stored is installed. The emergency rack input entrance 113 is a place for inputting a specimen rack (calibration specimen rack) carrying a standard solution, or the specimen rack 111 storing the specimen containers 122 in which specimens required to be urgently analyzed are accommodated, into the device. The buffer 104 holds a plurality of specimen racks 111 transported by the first transport line 102, in such a manner that the order of dispensing the specimens in the specimen racks 111 can be changed. The analysis section 105 is one analyzing the specimens transported from the buffer 104 via a second transport line 106 and details will be described hereinafter.

The storage part 103 stores the specimen rack 111 in which the specimen container 122 holding the specimen having been subjected to analysis in the analysis section 105 is accommodated. The display section 118 is display equipment for displaying an analysis result of the concentration of a predetermined component in the liquid specimen such as blood and urine. The control section 120 is constituted of a computer or the like and performs arithmetic processing finding the concentration of the predetermined component in the liquid specimen such as blood and urine, while controlling each mechanism in the specimen analysis device 100.

Here, the first transport line 102 is a line transporting the specimen rack 111 which is installed in the carry-in section 101, and is equivalent in configuration to any of the transport devices in the above-mentioned embodiments 1 to 3. In this embodiment, a magnetic body, preferably a permanent magnet is provided on a back surface of the specimen rack 111 which is a to-be-transported object.

Moreover, the analysis section 105 is constituted of a second transport line 106, a reaction disk 108, a specimen dispensing nozzle 107, a reagent disk 110, a reagent dispensing nozzle 109, a cleaning mechanism 112, a reagent tray 114, a reagent ID reader 115, a reagent loader 116, a spectrophotometer 121, etc.

Here, the second transport line 106 is a line carrying the specimen rack 111 in the buffer 104 into the analysis section 105 and equivalent in configuration to any of the transport devices described in the above-mentioned embodiments 1 to 3.

Moreover, the reaction disk 108 is provided with a plurality of reaction containers. The specimen dispensing nozzle 107 dispenses specimens into the reaction containers of the reaction disk 108 from the specimen container 122 by rotary drive or vertical drive. The reagent disk 110 carries a plurality of reagents. The reagent dispensing nozzle 109 dispenses reagents into the reaction containers of the reaction disk 108 from a reagent bottle in the reagent disk 110.

The cleaning mechanism 112 cleans the reaction containers of the reaction disk 108. The spectrophotometer 112 measures transmitted light obtained from a light source (illustration of which is omitted) via reaction liquid of the reaction container, to thereby measure absorbance of the reaction liquid. The reagent tray 114 is a member installing a reagent in a case of performing reagent registration to the specimen analysis device 100. The reagent ID reader 115 is equipment for reading a reagent ID attached to the reagent installed in the reagent tray 114, to thereby obtain reagent information. The reagent loader 116 is equipment carrying the reagent into the reagent disk 110.

An analytical treatment of the specimen by the specimen analysis device 100 as described above is performed according to the following order.

First, the specimen racks 111 are installed in the carry-in section 101 or the emergency rack input entrance 113 and carried in the randomly accessible buffer 104 by the first transport line 102.

The specimen analysis device 100 carries a specimen rack 111 of the highest priority order among the racks stored in the buffer 104 into the analysis section 105 by the second transport line 106, according to a rule of the priority order.

The specimen rack 111 that arrives at the analysis section 105 is further transferred to a specimen portioning position near the reaction disk 108 by the second transport line 106 and the specimen is portioned into the reaction container of the reaction disk 108 by the specimen dispensing nozzle 107. By the specimen dispensing nozzle 107, portioning of the specimen is performed by necessary times depending upon analysis items requested for the specimen.

By the specimen dispensing nozzle 107, portioning of specimens is performed with respect to all specimen containers 122 installed in the specimen rack 111. The specimen rack 111 in which portioning treatment with respect to all the specimen containers 122 is completed is again transferred to the buffer 104. The specimen rack 111 in which all specimen portioning treatments including automatic re-inspection is completed is transferred to the storage part 103 by the second transport line 106 and the first transport line 102.

Moreover, the reagent used for analysis is portioned into the reaction container into which the specimen is previously portioned from the reagent bottle on the reagent disk 110 by the reagent dispensing nozzle 109. Subsequently, mixing of mixture liquid of the specimen and reagent in the reaction container is performed by a stirring mechanism (illustration of which is omitted).

Thereafter, the light produced from the light source is transmitted through the reaction container containing the mixture liquid after stirring and light intensity of the transmitted light is measured by the spectrophotometer 121. The light intensity measured by the spectrophotometer 121 is transmitted to the control section 120 via an A/D converter and an interface. Then, an arithmetic operation is performed by the control section 120, the concentration of the predetermined component in the liquid reagent such as blood or urine is found, and a result is displayed by the display section 118, etc. and memorized in a memory section (illustration of which is omitted).

Incidentally, the specimen analysis device 100 is not necessarily provided with all the configurations described above, a unit for pretreatment may be appropriately added and a partial unit or a partial configuration may be eliminated. Even in this case, the analysis section 105 and the carry-in section 101 are connected by the first transport line 102 and the specimen rack 111 is transported from the carry-in section 101.

Figure 9:
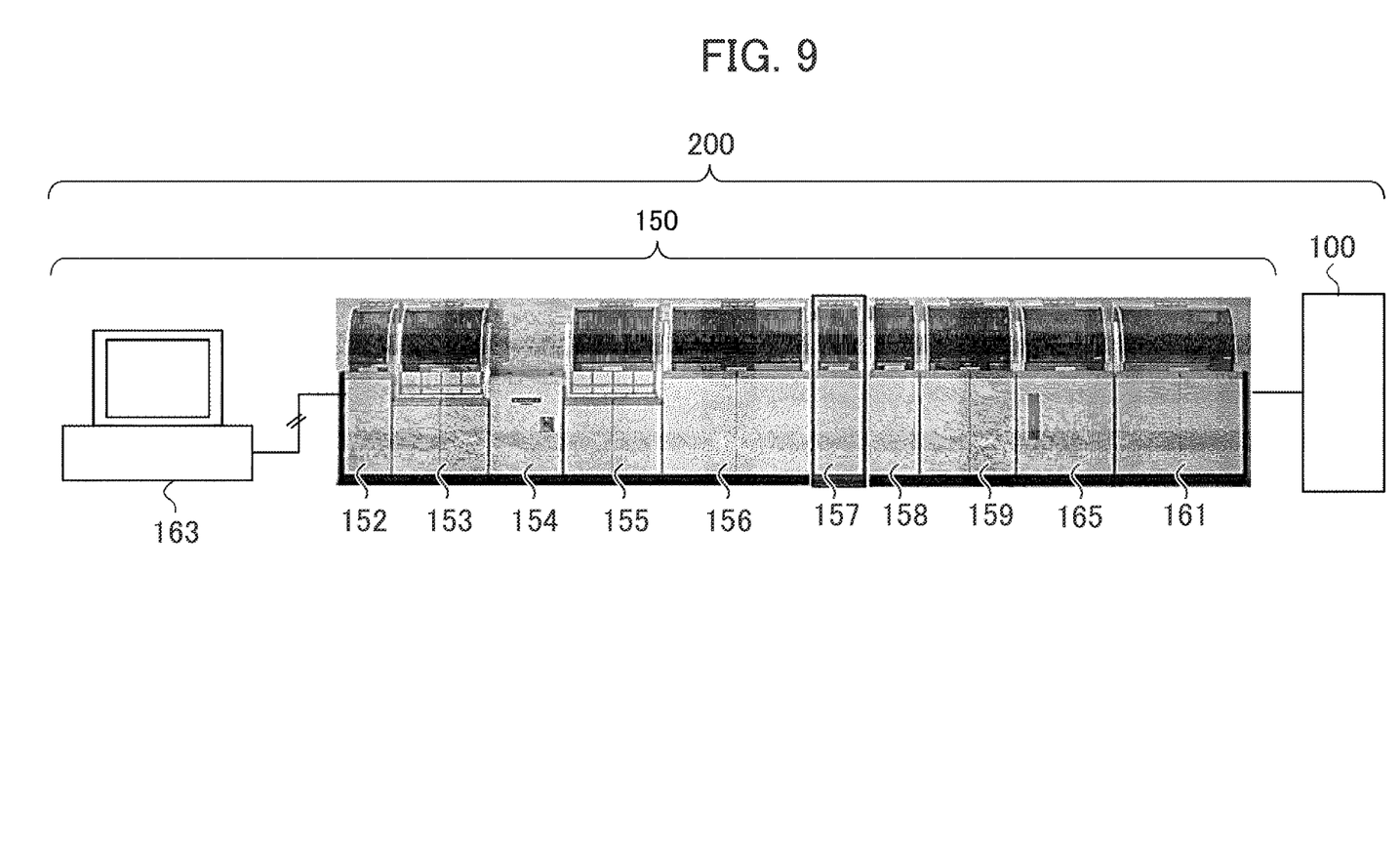
FIG. 9 is a view showing one example of a specimen pretreatment device of the embodiment 4 of the present invention.

Next, referring to FIG. 9, an entire configuration of the specimen pretreatment device 150 will be explained. FIG. 9 is a view schematically showing the entire configuration of the specimen pretreatment device 150.

In FIG. 9, the specimen pretreatment device 150 is a device performing various pretreatments required for analysis of the specimen. From the left to right in FIG. 9, the specimen pretreatment device 150 comprises a plugging unit 152, a specimen storage unit 153, an empty holder stacker 154, a specimen input unit 155, a centrifugal separation unit 156, a liquid quantity measurement unit 157, an unplugging unit 158, a child specimen container preparation unit 159, a dispensing unit 165, a plurality of units employing a transfer unit 161 as a basic element, and an operation section PC 163 controlling operation of the plurality of units. Moreover, as a transfer destination of the specimen treated in the specimen pretreatment device 150, the specimen analysis device 100 for performing qualitative/quantitative analysis of the component of the specimen is connected.

The specimen input unit 155 is a unit for inputting the specimen container 122 containing the specimen into the specimen pretreatment device 150. The centrifugal separation unit 156 is a unit for performing centrifugal separation with respect to the inputted specimen container 122. The liquid quantity measurement unit 157 is a unit performing liquid quantity measurement of the specimen stored in the specimen container 122. The unplugging unit 158 is a unit unplugging a plug of the inputted specimen container 122. The child specimen container preparation unit 159 is a unit making preparations required for dispensing the specimen stored in the inputted specimen container 122 in the next dispensing unit 165. The dispensing unit 165 is a unit portioning the centrifugally separated specimen for analysis in the specimen analysis system, etc., and affixing a bar cord, etc. to a portioned specimen container (child specimen container) 122. The transfer unit 161 is a unit performing classification of the child specimen container 122 having been subjected to dispensing, and making preparations for transferring to the specimen analysis system. The plugging unit 152 is a unit plugging a plug into the specimen container 122 or the child specimen container 122. The specimen storage unit 153 is a unit storing the plugged specimen container 122.

Here, in the specimen pretreatment device 150, a specimen holder (not shown) holding the specimen containers 122 one by one is transported among the respective units by a third transport line (not shown). And, in the transfer unit 161, transferring of the specimen containers 122 is performed between the specimen holder, used for transport of the specimen containers 122 by the third transport line in the specimen pretreatment device 150, and the specimen rack 111 (carrying five specimen containers 122) used for transport of the specimen containers 122 by the first transport line 102 in the specimen analysis device 100. Namely, the specimen container 122 having been subjected to pretreatment in the specimen pretreatment device 150 is carried out to the first transport line 102 in the specimen analysis device 100 via the transfer unit 161.

Incidentally, the specimen pretreatment device 150 is not necessarily provided with all the configurations described above, a unit may be further added and a partial unit or a partial configuration may be eliminated. Moreover, as shown in FIG. 9, a specimen analysis system 200 in which the specimen pretreatment device 150 and the specimen analysis device 100 are combined may be employed. In this case, not only in the respective devices but also between the devices and the devices, connection is made by the transport devices described in the above-mentioned embodiment 1 to embodiment 3 and the specimen container 122 can be transported.

In the specimen analysis device 100 and specimen pretreatment device 150 of this embodiment and further the system in which they are combined, such transport devices as described in the embodiment 1 to the embodiment 3 are provided, so that it is possible to suppress a useless current loss to efficiently transport the specimen rack 111 or the specimen holder.

Others

Incidentally, the present invention is not limited to the above-mentioned embodiments but includes various modifications. The above-mentioned embodiments are explained in detail to explain the invention in an easy-to-understand manner and are not necessarily limited to those having all the described configurations. Further, a part of a configuration of one embodiment can be replaced with a configuration of another embodiment, and further, the configuration of another embodiment can be added to the configuration of one embodiment. Further, it is also possible to add, delete, and replace other configurations with respect to a part of the configuration of each embodiment.

For example, while the case where the to-be-transported object transported by the transport device is the specimen rack 111 or the specimen holder is explained in the embodiment 1 to the embodiment 4, the to-be-transported object is not limited to the rack and the holder that hold the specimen container 122, and it is possible to select various objects, for which large scale transport is required, as transport targets.

REFERENCE SIGNS LIST

1: Transport device
10: Permanent magnet (First magnetic body)
11: Transport surface 21, 21a, 21b: Winding
22, 22a, 22b: Core (Second magnetic body)
25, 25a, 25b: Magnetic pole (Magnetic circuit)
30: Current detection section
40: Arithmetic section
50: Drive circuit
55: Power source
80: Direction of magnetic flux produced by current
90: Direction of magnetic flux of permanent magnet
100: Specimen analysis device
101: Carry-in section
102: First transport line
103: Storage part
104: Buffer
105: Analysis section
106: Second transport line
107: Specimen dispensing nozzle
108: Reaction disk
109: Reagent dispensing nozzle
110: Reagent disk
111: Specimen rack (To-be-transported object)
112: Cleaning mechanism
113: Emergency rack input entrance
114: Reagent tray
115: Reagent ID reader
116: Reagent loader
118: Display section
120: Control section
121: Spectrophotometer
122: Specimen container, Child specimen container
150: Specimen pretreatment device
152: Plugging unit
153: Specimen storage unit
154: Holder stacker
155: Specimen input unit
156: Centrifugal separation unit
157: Liquid quantity measurement unit
158: Unplugging unit
159: Child specimen container preparation unit
161: Transfer unit
163: Operation section PC
165: Dispensing unit
200: Specimen analysis system

What is claimed is:

1. A transport device comprising:
a first magnetic body provided on a side of a to-be-transported object;
a plurality of magnetic circuits, each of the plurality of magnetic circuits comprises a core consisting of a second magnetic body, and a winding around the outside of the core; and
a plurality of drive circuits, each of the plurality of drive circuits configured to supply a current to the winding of a different one of the plurality of magnetic circuits in such a manner as to cause an attractive or repulsive electromagnetic force between the plurality of magnetic circuits and the first magnetic body,
wherein a diameter of the first magnetic body is less than a diameter of any one of the plurality of magnetic circuits, which comprise the core and the winding around the outside of the core,
wherein the plurality of magnetic circuits are disposed in a linear array along a direction of travel of the first magnetic body such that the second magnetic bodies form a plane along which the first magnetic body is to be positioned,
wherein a first magnetic circuit is one of the plurality of magnetic circuits and a second magnetic circuit is another of the plurality of magnetic circuits which is adjacent to the first magnetic circuit in the direction of travel of the first magnetic body,
wherein in a case where predetermined currents with the same absolute value are applied to the first magnetic circuit and the second magnetic circuit in such a manner as to cause a repulsive electromagnetic force between the first magnetic body and the first magnetic circuit, and to cause an attractive electromagnetic force between the first magnetic body and the second magnetic circuit,
when the first magnetic body is located between the first magnetic circuit and a first predetermined position, an absolute value of an electromagnetic attraction force to the first magnetic body which is produced by the second magnetic circuit is larger than an absolute value of an electromagnetic repulsive force with respect to the first magnetic body which is produced by the first magnetic circuit,
when the first magnetic body is located at the first predetermined position, an absolute value of an electromagnetic attraction force to the first magnetic body which is produced by the second magnetic circuit is equal to an absolute value of an electromagnetic repulsive force with respect to the first magnetic body which is produced by the first magnetic circuit, and
when the first magnetic body is located between the first predetermined position and the second magnetic circuit, an absolute value of an electromagnetic attraction force to the first magnetic body which is produced by the second magnetic circuit is smaller than an absolute value of an electromagnetic repulsive force with respect to the first magnetic body which is produced by the first magnetic circuit, and
wherein in a case where the first magnetic body is located on a side of the first magnetic circuit relative to the first predetermined position, the plurality of drive circuits mainly supply a current to a winding of the second magnetic circuit in such a manner that an electromagnetic attraction force which is produced between the first magnetic body and the second magnetic circuit becomes a main thrust,
wherein in a case where the first magnetic body is located on a side of the second magnetic circuit relative to the first predetermined position, the plurality of drive circuits mainly supply a current to a winding of the first magnetic circuit in such a manner that an electromagnetic repulsive force which is produced between the first magnetic body and the first magnetic circuit becomes a main thrust,
wherein in a case where the movement of the first magnetic body is initiated, the drive circuit of the second magnetic circuit supplies a current to the winding of the second magnetic circuit in such a manner that an electromagnetic attraction force is produced between the first magnetic body and the second magnetic circuit as a thrust to initiate the movement of the first magnetic body in the direction of travel, and
wherein the first predetermined position is a position where an absolute value of the electromagnetic repulsive force generated by the first magnetic circuit and an absolute value of the electromagnetic attraction force generated by the second magnetic circuit become equal.

2. A specimen analysis system equipped with the transport device according to claim 1,
wherein the to-be-transported object is a holder or rack holding a specimen container.

3. A transport device comprising:
a first magnetic body provided on a side of a to-be-transported object;
a plurality of magnetic circuits, each of the plurality of magnetic circuits comprises a core consisting of a second magnetic body, and a winding around the outside of the core; and
a plurality of drive circuits, each of the plurality of drive circuits configured to supply a current to the winding of a different one of the plurality of magnetic circuits in such a manner as to cause an attractive or repulsive electromagnetic force between the plurality of magnetic circuits and the first magnetic body,
wherein a diameter of the first magnetic body is less than a diameter of any one of the plurality of magnetic circuits, which comprise the core and the winding around the outside of the core,
wherein the plurality of magnetic circuits are disposed in a linear array along a direction of travel of the first magnetic body such that second magnetic bodies form a plane along which the first magnetic body is to be positioned,
wherein a first magnetic circuit is one of the plurality of magnetic circuits and a second magnetic circuit is another of the plurality of magnetic circuits which is adjacent to the first magnetic circuit in the direction of travel of the first magnetic body,
wherein in a case where predetermined currents with the same absolute value are applied to the first magnetic circuit and the second magnetic circuit in such a manner as to cause a repulsive electromagnetic force between the first magnetic body and the first magnetic circuit, and to cause an attractive electromagnetic force between the first magnetic body and the second magnetic circuit,
when the first magnetic body is located between the first magnetic circuit and a first predetermined position, an absolute value of an electromagnetic attraction force to the first magnetic body which is produced by the second magnetic circuit is larger than an absolute value of an electromagnetic repulsive force with respect to the first magnetic body which is produced by the first magnetic circuit,
when the first magnetic body is located at the first predetermined position, an absolute value of an electromagnetic attraction force to the first magnetic body which is produced by the second magnetic circuit is equal to an absolute value of an electromagnetic repulsive force with respect to the first magnetic body which is produced by the first magnetic circuit,
when the first magnetic body is located between the first predetermined position and a second predetermined position, an absolute value of an electromagnetic attraction force to the first magnetic body which is produced by the second magnetic circuit is smaller than an absolute value of an electromagnetic repulsive force with respect to the first magnetic body which is produced by the first magnetic circuit,
when the first magnetic body is located at the second predetermined position, an absolute value of an electromagnetic attraction force to the first magnetic body which is produced by the second magnetic circuit is equal to an absolute value of an electromagnetic repulsive force with respect to the first magnetic body which is produced by the first magnetic circuit, and
when the first magnetic body is located between the second predetermined position and the second magnetic circuit, an absolute value of an electromagnetic attraction force to the first magnetic body which is produced by the second magnetic circuit is larger than an absolute value of an electromagnetic repulsive force with respect to the first magnetic body which is produced by the first magnetic circuit,
wherein in a case where the first magnetic body is located on a side of the first magnetic circuit relative to the first predetermined position, the plurality of drive circuits mainly supply a current to a winding of the second magnetic circuit in such a manner that an electromagnetic attraction which is produced between the first magnetic body and the second magnetic circuit becomes a main thrust,
wherein in a case where the first magnetic body is located between the first predetermined position and the second predetermined position, the plurality of drive circuits mainly supply a current to a winding of the first magnetic circuit in such a manner that an electromagnetic repulsive force that is produced between the first magnetic body and the first magnetic circuit becomes a main thrust,
wherein in a case where the first magnetic body is located on a side of the second magnetic circuit relative to the second predetermined position, the plurality of drive circuits mainly supply a current to the winding of the second magnetic circuit in such a manner that an electromagnetic attraction force which is produced between the first magnetic body and the second magnetic circuit becomes a main thrust, and
wherein in a case where the movement of the first magnetic body is initiated, the drive circuit of the second magnetic circuit supplies a current to the winding of the second magnetic circuit in such a manner that an electromagnetic attraction force is produced between the first magnetic body and the second magnetic circuit as a thrust to initiate the movement of the first magnetic body in the direction of travel,
wherein the first predetermined position is a position where an absolute value of the electromagnetic repulsive force generated by the first magnetic circuit and an absolute value of the electromagnetic attraction force generated by the second magnetic circuit become equal.

4. A transport method by a transport device, comprising:
a to-be-transported object having a first magnetic body;
a plurality of magnetic circuits, each of the plurality of magnetic circuits comprises having a core consisting of a second magnetic body and a winding around the outside of the core; and
a plurality of drive circuits, each of the plurality of drive circuits configured to supply a current to the winding of a different one of the plurality of magnetic circuits in such a manner as to cause an attractive or repulsive electromagnetic force between the plurality of magnetic circuits and the first magnetic body,
wherein a width of the first magnetic body is less than a width of any one of the plurality of magnetic circuits including the core and the winding around the outside of the core,
wherein the plurality of magnetic circuits are disposed in a linear array along a direction of travel of the first magnetic body such that the second magnetic bodies form a plane along which the first magnetic body is to be positioned, wherein a first magnetic circuit is one of the plurality of magnetic circuits and a second magnetic circuit is another of the plurality of magnetic circuits which is adjacent to the first magnetic circuit in the direction of travel of the first magnetic body, wherein in a case where predetermined currents with the same absolute value are applied to windings of the first magnetic circuit and second magnetic circuit in such a manner as to cause a repulsive electromagnetic force between the first magnetic body and the first magnetic circuit, and to cause an attractive electromagnetic force between the first magnetic body and the second magnetic circuit, when the first magnetic body is located from the first magnetic circuit and a first predetermined position, an absolute value of an electromagnetic attraction force to the first magnetic body which is produced by the second magnetic circuit is larger than an absolute value of an electromagnetic repulsive force with respect to the first magnetic body which is produced by the first magnetic circuit, when the first magnetic body is located at the first predetermined position, an absolute value of an electromagnetic attraction force to the first magnetic body which is produced by the second magnetic circuit is equal to an absolute value of an electromagnetic repulsive force with respect to the first magnetic body which is produced by the first magnetic circuit, and when the first magnetic body is located between the first predetermined position and the second magnetic circuit, an absolute value of an electromagnetic attraction force to the first magnetic body which is produced by the second magnetic circuit is smaller than an absolute value of an electromagnetic repulsive force with respect to the first magnetic body which is produced by the first magnetic circuit, and wherein the transport method comprises:

wherein in a case where the first magnetic body is located on a side of the first magnetic circuit relative to the first predetermined position, transporting the to-be-transported object, using an electromagnetic attraction force that is produced between the second magnetic circuit and the first magnetic body by mainly supplying a current to a winding of the second magnetic circuit, as a main thrust;

wherein in a case where the first magnetic body is located on a side of the second magnetic circuit relative to the first predetermined position, transporting the to-be-transported object, using an electromagnetic repulsive force that is produced between the first magnetic circuit and the first magnetic body by mainly supplying a current to a winding of the first magnetic circuit, as a main thrust;

in a case where the movement of the first magnetic body is initiated, supplying a current to the winding of the second magnetic circuit in such a manner that an electromagnetic attraction force is produced between the first magnetic body and the second magnetic circuit as a thrust to initiate the movement of the first magnetic body in the direction of travel, and wherein the first predetermined position is a position where an absolute value of the electromagnetic repulsive force generated by the first magnetic circuit and an absolute value of the electromagnetic attraction force generated by the second magnetic circuit become equal.

5. A method by a transport device, comprising:
a to-be-transported object having a first magnetic body;
a plurality of magnetic circuits, each of the plurality of magnetic circuits comprises having a core consisting of a second magnetic body and having a winding; and
a drive circuits, each of the plurality of drive circuits configured to supply a current to the winding of a different one of the plurality of magnetic circuits such a manner as to cause an attractive or repulsive electromagnetic force between the plurality of magnetic circuits and the first magnetic body, wherein a width of the first magnetic body is less than a width of any one of the plurality of magnetic circuits including the core and the winding around the outside of the core, wherein the plurality of magnetic circuits are disposed in a linear array along a direction of travel of the first magnetic body such that second magnetic bodies form a plane along which the first magnetic body is to be positioned, wherein a first magnetic circuit is one of the plurality of magnetic circuits and a second magnetic circuit is another of the plurality of magnetic circuits which is adjacent to the first magnetic circuit in the direction of travel of the first magnetic body, wherein in a case where predetermined currents with the same absolute value are applied to windings of the first magnetic circuit and second magnetic circuit in such a manner as to cause a repulsive electromagnetic force between the first magnetic body and the first magnetic circuit, and to cause an attractive electromagnetic force between the first magnetic body and the second magnetic circuit, when the first magnetic body is located between the first magnetic circuit and a first predetermined position, an absolute value of an electromagnetic attraction force to the first magnetic body which is produced by the second magnetic circuit is larger than an absolute value of an electromagnetic repulsive force with respect to the first magnetic body which is produced by the first magnetic circuit, when the first magnetic body is located at the first predetermined position, an absolute value of an electromagnetic attraction force to the first magnetic body which is produced by the second magnetic circuit is equal to an absolute value of an electromagnetic repulsive force with respect to the first magnetic body which is produced by the first magnetic circuit, when the first magnetic body is located between the first predetermined position and a second predetermined position, an absolute value of an electromagnetic attraction force to the first magnetic body which is produced by the second magnetic circuit is smaller than an absolute value of an electromagnetic repulsive force with respect to the first magnetic body which is produced by the first magnetic circuit, when the first magnetic body is located at the second predetermined position, an absolute value of an electromagnetic attraction force to the first magnetic body that is produced by the second magnetic circuit is equal to an absolute value of an electromagnetic repulsive force with respect to the first magnetic body which is produced by the first magnetic circuit, and when the first magnetic body is located between the second predetermined position and the second magnetic circuit, an absolute value of an electromagnetic attraction force to the first magnetic body which is produced by the second magnetic circuit is larger than an absolute value of an electromagnetic repulsive force with respect to the first magnetic body which is produced by the first magnetic circuit, and wherein the transport method comprises:

wherein in a case where the first magnetic body is located on a side of the first magnetic circuit relative to the first predetermined position, transporting the to-be-transported object, using an electromagnetic attraction force that is produced between the second magnetic circuit and the first magnetic body by mainly supplying a current to a winding of the second magnetic circuit, as a main thrust;

wherein in a case where the first magnetic body is located between the first predetermined position and the second predetermined position, transporting the to-be-transported object, using an electromagnetic repulsive force that is produced between the first magnetic circuit and the first magnetic body by mainly supplying a current to a winding of the first magnetic circuit, as a main thrust;

wherein in a case where the first magnetic body is located on a side of the second magnetic circuit relative to the second predetermined position, transporting the to-be-transported object, using an electromagnetic repulsive force that is produced between the second magnetic circuit and the first magnetic body by mainly supplying a current to the winding of the second magnetic circuit, as a main thrust; and in a case where the movement of the first magnetic body is initiated, supplying a current to the winding of the second magnetic circuit in such a manner that an electromagnetic attraction force is produced between the first magnetic body and the second magnetic circuit as a thrust to initiate the movement of the first magnetic body in the direction of travel, wherein the first predetermined position is a position where an absolute value of the electromagnetic repulsive force generated by the first magnetic circuit and an absolute value of the electromagnetic attraction force generated by the second magnetic circuit become equal.

* * * * *